United States Patent
Khartabil (10) Patent No.: US 7,039,710 B2
(45) Date of Patent: May 2, 2006

(54) METHOD AND APPARATUS FOR PROVIDING MULTI-CLIENT SUPPORT IN A SIP-ENABLED TERMINAL

(75) Inventor: Hisham Khartabil, Helsinki (FI)

(73) Assignee: Nokia Corporation, Espoo (FI)

( * ) Notice: Subject to any disclaimer, the term of this patent is extended or adjusted under 35 U.S.C. 154(b) by 155 days.

(21) Appl. No.: 10/393,499

(22) Filed: Mar. 20, 2003

(65) Prior Publication Data

US 2004/0250252 A1 Dec. 9, 2004

(51) Int. Cl.
*G06F 15/16* (2006.01)

(52) U.S. Cl. .................. 709/227; 709/230; 719/313

(58) Field of Classification Search ......... 719/310–320; 709/200–203, 227–239; 455/507–520, 416
See application file for complete search history.

(56) References Cited

U.S. PATENT DOCUMENTS

| | | | |
|---|---|---|---|
| 6,182,146 B1 * | 1/2001 | Graham-Cumming, Jr. . | 709/238 |
| 2002/0037735 A1 * | 3/2002 | Maggenti et al. ........... | 455/517 |
| 2002/0052214 A1 * | 5/2002 | Maggenti et al. ........... | 455/517 |
| 2002/0055366 A1 * | 5/2002 | Maggenti et al. ........... | 455/517 |
| 2002/0058523 A1 * | 5/2002 | Maggenti et al. ........... | 455/517 |
| 2002/0061759 A1 * | 5/2002 | Maggenti et al. ........... | 455/517 |
| 2002/0061760 A1 * | 5/2002 | Maggenti et al. ........... | 455/518 |
| 2002/0061761 A1 * | 5/2002 | Maggenti et al. ........... | 455/518 |
| 2002/0061762 A1 * | 5/2002 | Maggenti et al. ........... | 455/519 |
| 2002/0068595 A1 * | 6/2002 | Maggenti et al. ........... | 455/519 |
| 2002/0077136 A1 * | 6/2002 | Maggenti et al. ........... | 455/518 |
| 2002/0086665 A1 * | 7/2002 | Maggenti et al. ........... | 455/416 |
| 2002/0094831 A1 * | 7/2002 | Maggenti et al. ........... | 455/518 |
| 2002/0102999 A1 * | 8/2002 | Maggentia et al. ......... | 455/518 |

FOREIGN PATENT DOCUMENTS

WO      WO 01/91404 A2     11/2001

OTHER PUBLICATIONS

J. Rosenberg, H. Schulzrinne, G. Camarillo, A. Johnston, J. Peterson, R. Sparks, M. Handley and E. Schooler, *SIP: Session Initiation Protocol*, pp. 1–252, Jun. 2002.

* cited by examiner

*Primary Examiner*—St. John Courtenay, III
(74) *Attorney, Agent, or Firm*—Hollingsworth & Funk, LLC (57) ABSTRACT

A method and apparatus for providing multi-client support in a SIP-enabled terminal involves providing a SIP processing stack on the terminal. A SIP processing stack listens on multiple ports of a network interface. Each port is associated with a client application. The SIP processing stack sends and receives SIP messages for the client applications. Incoming SIP messages are sent to the appropriate client by looking at the port at which the SIP message was received.

32 Claims, 4 Drawing Sheets

METHOD AND APPARATUS FOR PROVIDING MULTI-CLIENT SUPPORT IN A SIP-ENABLED TERMINAL

FIELD OF THE INVENTION

This disclosure relates in general to computing and communications devices, and more particularly to a method and apparatus for using the session initiation protocol or analogous protocol in a multi-client environment.

BACKGROUND OF THE INVENTION

Personal communication devices are becoming more widely adopted by the public. Such devices as cellular phones, personal digital assistants, and laptop computers give users a variety of mobile communications and computer networking capabilities. These devices are increasingly able to communicate using a wide variety of digital multimedia formats, include voice, music, video, text messaging, etc.

One important standard that has allowed providing digital multimedia to mobile and other computing devices is the Session Initiation Protocol (SIP). SIP is a signaling protocol that assists digital devices in establishing end-to-end multimedia sessions. SIP provides features that resemble those provided by the Public Switch Telephone Network (PSTN) as well as Internet protocols such as Transmission Control Protocol/Internet Protocol (TCP/IP) and Hypertext Transfer Protocol (HTTP).

SIP operates similarly to HTTP, in that it is a text based message protocol operating on a well-known network port. From the terminal's perspective, SIP is different than HTTP because the terminal must have a listening process to be notified of incoming communications. In contrast, a web browser utilizing HTTP is purely a client the browsers initiates connections to listening servers at the users request, and does not listen for incoming connections.

As devices such as mobile phones and personal digital assistants (PDAs) become more sophisticated, these devices will allow the users to run more multimedia aware applications simultaneously. It is likely that these applications will utilize the SIP protocol. Therefore, there may be a high degree of redundancy, as each application will include its own SIP protocol stack. Having multiple SIP aware applications could cause confusion on the part of the users, as there may be contention for well-known TCP/IP listening ports on the device. This contention could lead to errors and the requirement that users specially configure software to work simultaneously. This is disadvantageous because users generally do not understand concepts such as TCP/IP ports, and may cause problems if an alternate, well-known port (such as one for HTTP or telnet) is selected by the user to receive SIP.

What is needed is a way to provide SIP functionality to multiple client applications on a communications device. The present invention addresses these and other needs, and offers other advantages over prior art approaches.

SUMMARY OF THE INVENTION

To overcome limitations in the prior art described above, and to overcome other limitations that will become apparent upon reading and understanding the present specification, the present invention discloses a method and apparatus for processing the session establishment procedure for a plurality of clients. In one embodiment, a computer implemented method of processing a session establishment procedure involves associating a unique network port of a network interface with each client of the plurality of clients. A message processing stack is employed to listen on the unique network ports of the network interface. A message is received at the message processing stack from one of the unique ports of the network interface. The message is communicated from the message processing stack to the client associated with the unique port.

In another embodiment of the present invention, a system is connected to a network for processing a Session Initiation Protocol (SIP) for one or more client applications. The system includes a network interface means having a plurality of ports for receiving SIP messages from the network. A SIP processor receives SIP messages at the plurality of ports of the network interface means. An inter-process communication means facilitates communications between the SIP processor and the client applications. The SIP processor is configured to communicate SIP messages to the client applications using the inter-process communications means based on which port the SIP messages are received.

In accordance with another embodiment of the invention, an apparatus arranged to interface with a network is provided. The apparatus includes a network interface having a plurality of ports configured for receiving a session establishment message from the network, and an inter-process communication means. The apparatus includes a processor arranged to receive the session establishment message at one of the ports of the network interface, to determine a destination client application based on which port of the ports the session establishment message is received, and to communicate the session establishment message to the destination application using the inter-process communication means.

The above summary of the present invention is not intended to describe each illustrated embodiment or implementation of the present invention. This is the purpose of the figures and the associated discussion which follows.

BRIEF DESCRIPTION OF THE DRAWINGS

The invention is described in connection with the embodiments illustrated in the following diagrams.

DETAILED DESCRIPTION OF THE INVENTION

In the following description of the example embodiments, reference is made to the accompanying drawings which form a part hereof, and in which is shown by way of illustration various manners in which the invention may be practiced. It is to be understood that other embodiments may be utilized, as structural and operational changes may be made without departing from the scope of the present invention.

Generally, the present invention provides a method and apparatus for providing common session establishment procedures for multiple client applications. One protocol in particular that can be used for establishing sessions is the Session Initiation Protocol (SIP). Each client is enabled to communicate with a common message processing stack (also referred to herein as a "SIP stack") to send and receive session establishment messages such as SIP messages. The SIP stack assigns a unique port for each of the clients. The SIP stack can receive all incoming SIP messages and communicate the messages to the appropriate client based on the port at which the messages are received. The SIP stack can also send outgoing SIP messages, as well as handling multiple request-response exchanges required by SIP. Using a SIP stack frees the clients from having to deal with some of the states and timing of these SIP exchanges.

The primary purpose of session protocols such as SIP is to establish sessions for end-to-end data communications between networked devices. SIP can also be used for such applications as event notifications, instant messaging and presence. One or more of the endpoints may be mobile, e.g. moving from location to location and from network to network. Mobile endpoints include all manner of digital communication devices. Although the present invention is described in terms of SIP, it is appreciated that concepts according to the present invention can be implemented using any form of session establishment procedure, and descriptions of the use of SIP as defined by IETF is provided for purposes of illustration, not of limitation.

In general, digital communication devices are electronic apparatuses that can exchange data with other devices. The data can be transmitted through various communication mediums such as wire, optical fiber, or through the air as electromagnetic or light waves. Increasingly, communication devices include some sort of computing hardware such as a microprocessor. The growth of microprocessor controlled devices has been steadily growing in the field of mobile communication devices (cellular phones, PDAs, etc.). By and large, most mobile communications devices use microprocessors and can therefore be considered mobile data processing devices.

Figure 1:
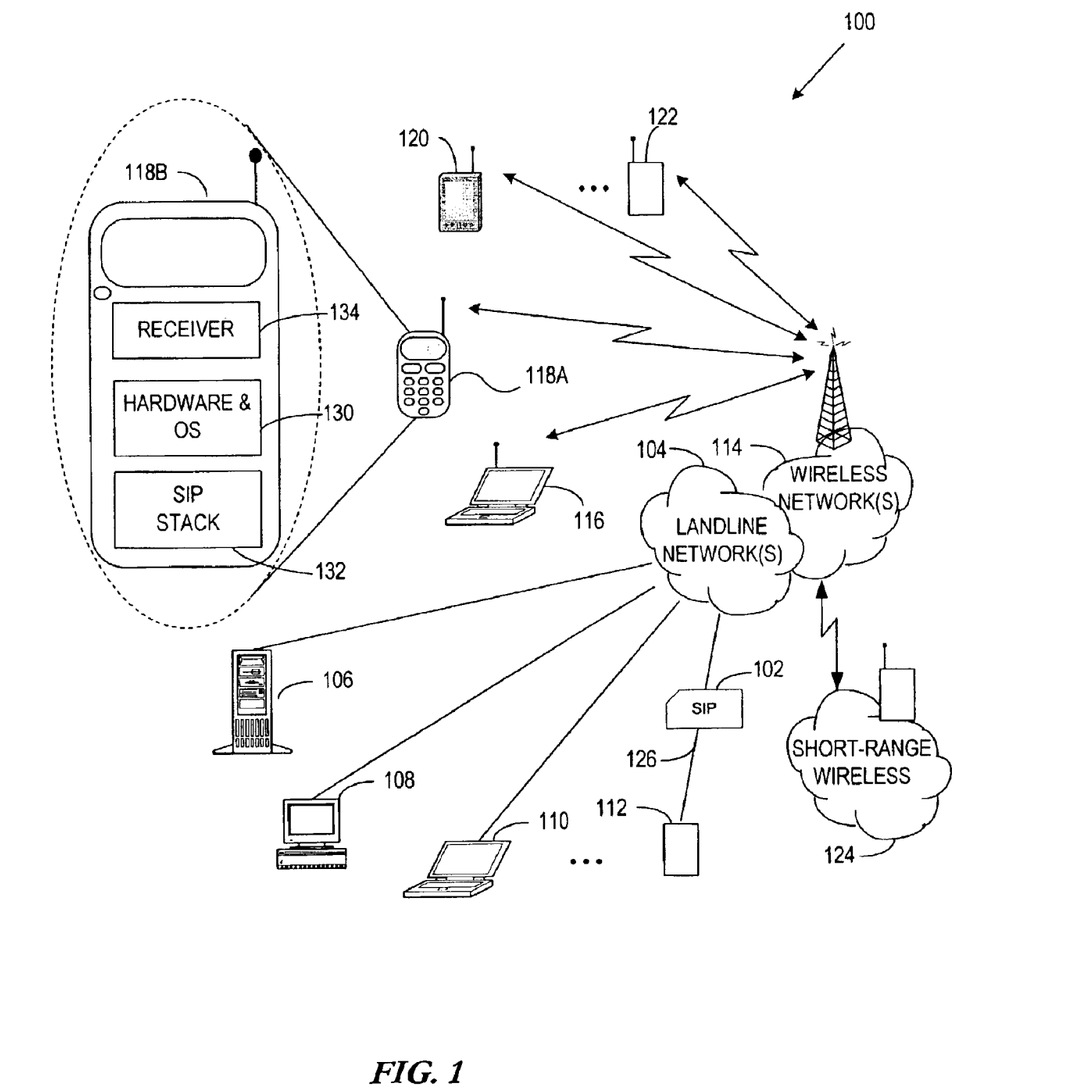
FIG. 1 illustrates a representative system environment in which the principles of the present invention may be employed.

FIG. 1 illustrates a representative system environment 100 in which the principles of the present invention may be employed. In the representative system environment 100, SIP messages 102 may be communicated between devices in any number of known manners. These manners include via a landline network(s) 104, which may include a Global Area Network (GAN) such as the Internet, one or more Wide Area Networks (WAN), Local Area Networks (LAN), and the like. Any computing device or other electronic device that supports SIP messages 102 may be the target system that utilizes the present invention, such as servers 106, desktop computers 108 or workstations, laptop or other portable computers 110, or any other similar computing device capable of communicating via the network 104, as represented by generic device 112.

The data 102 may be provided via one or more wireless networks 114, such as Global System for Mobile Communications (GSM), Universal Mobile Telecommunications System (UMTS), Personal Communications Service (PCS), Time Division Multiple Access (TDMA), Code Division Multiple Access (CDMA), or other mobile network transmission technology. Again, any mobile electronic device that can communicate using SIP can interface with a target system that utilizes concepts according to the present invention, such as laptop or other portable computers 116, mobile phones 118A and other mobile communicators, Personal Digital Assistants (PDA) 120, or any other similar computing device capable of communicating via the wireless network 114, as represented by generic device 122.

The SIP message 102 may be transferred between devices using short-range wireless technologies 124, such as Bluetooth, Wireless Local Area Network (WLAN), infrared (IR), etc. The SIP message 102 can also be distributed using direct wired connections, such as depicted by connection path 126. The present invention is applicable regardless of the manner in which the SIP message 102 is provided or distributed between the target devices.

An example of a target device that utilizes concepts according to the present invention is illustrated as the mobile phone 118B. The device 118B includes, for example, a radio transceiver 134 and hardware (including the processor) coupled to an operating system (OS) 130. The present invention may include a SIP processing stack 132 implemented as firmware, a module, or a program running on the OS 130. The SIP processing stack 132 can be used in any type of OS 130, including various versions of Windows®, Linux, Unix®, PalmOS®, etc.

Figure 2:
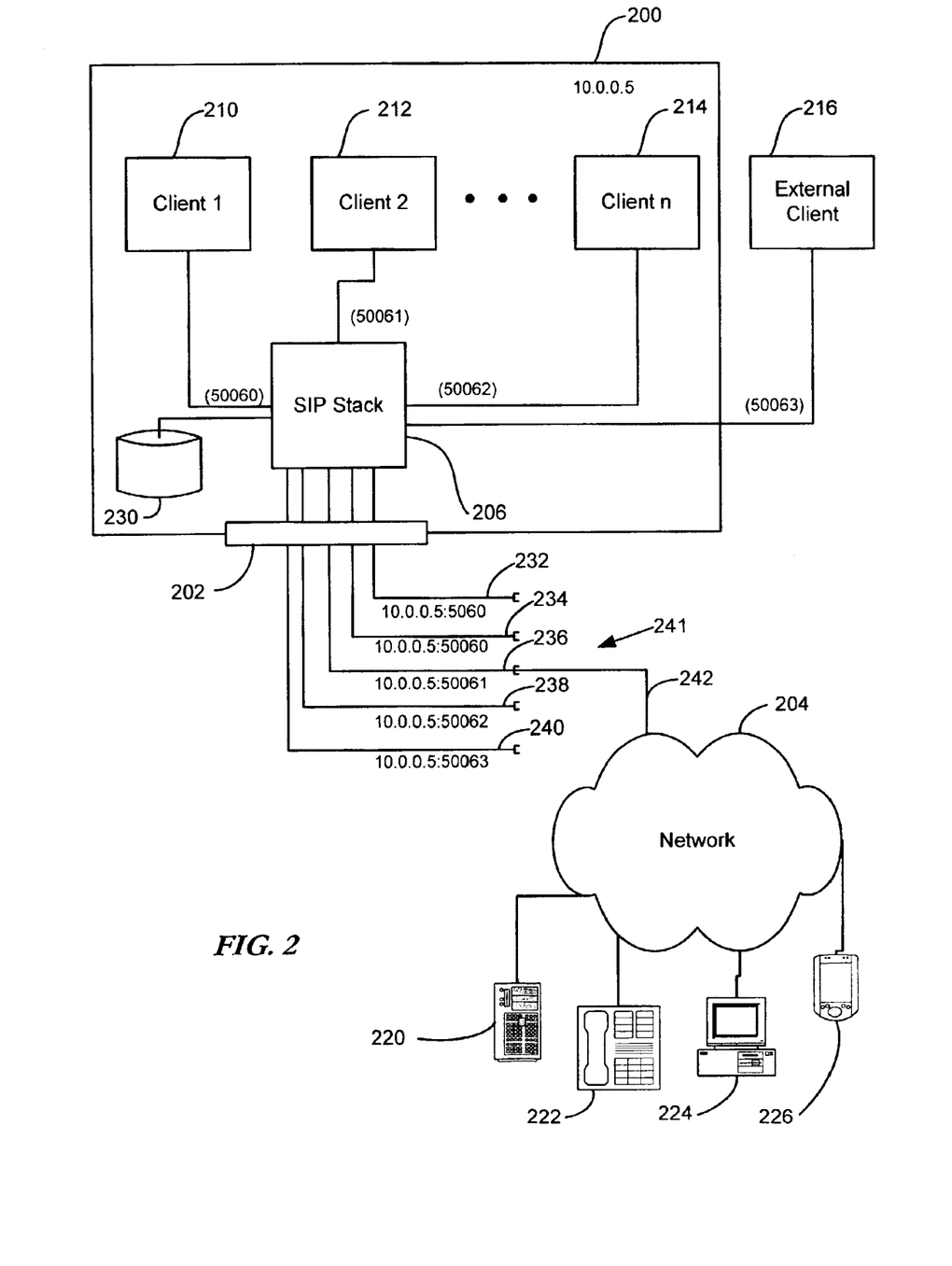
FIG. 2 is a diagram showing an arrangement of a SIP processing stack and client applications according to embodiments of the present invention.

In reference now to FIG. 2, an example communications device 200 is shown which illustrates concepts of the present invention. The communication device 200 includes a network interface 202 for communication with a network 204. The network 204 can be any type of digital communications network. The network 204 in this example provides some manner of SIP services, typically by having one or more SIP servers 220 and UAs 222, 224, 226 on the network 204.

The current version of the SIP specification is defined in Internet Engineering Task Force (IETF) RFC 3261, dated June 2002. RFC 3261 defines the behavior and data formats that can be used by a communication device according to embodiments of the present invention. The SIP specification includes protocols for creating, modifying, and terminating sessions with one or more participants. SIP can also be used for such applications as event notifications, instant messaging and presence. SIP is designed for use with networked data processing devices; therefore a device 200 according to the present invention will deal with SIP communications over the network interface 202. In particular, the communication device 200 acts as a user agent client (UAC) when sending SIP messages over the network interface 202 and a user agent server (UAS) when receiving SIP messages from the network interface 202.

The network interface 202 may be any physical or logical interface allowing communications with other networked devices. Network interfaces commonly utilize the Internet Protocol (IP) at the network layer of the International Standards Organization (ISO) networking protocol stack. Typically coupled with IP are Transmission Control Protocol (TCP) or User Datagram Protocol (UDP) at the transport layer of the OSI stack. It is appreciated, however, that the SIP specification is independent of any type of networking protocols, and may be used with various other network technologies known in the art.

The communications device 200 includes a message processing stack ("SIP stack") 206 that communicates with the network 204 through the network interface 202. The SIP stack 206 can be arranged to handle all SIP communications for the communications device 200.

The SIP stack 206 also communicates with clients 210, 212, 214 on the communications device 200. The general client characteristics will be described in relation to an example client 210, although it is appreciated these characteristics are applicable to all clients 210, 212, 214. Client 210 (also known as a "client application") is typically an application that is running on the communications device 200. The client 210 may deal with, among other things, formatting and presenting data to the users. The client 210 may include programs for handling tasks as voice/video communications, text messaging, web services, etc.

The SIP stack 200 may be configured to communicate with an external client 216 that is not necessarily running on the communications device 200. The external client 216 may be connected to the communications device 200 via a network interface or a data I/O bus, such as buses used by plug-in peripheral devices. Such peripheral devices may include storage devices such smart cards, PC cards, RAM/ROM modules, and disk drives. Autonomous devices such as phones, PDAs, computers, etc. may also be attached to the communication device 200 as peripherals or via a network to interface an external client 216 with the SIP stack 200. Insofar as the external client 216 looks the same to the SIP stack 206 as the other clients 210, 212, 214, descriptions of the example client 210 are also generally applicable to the external client 216.

Various techniques known in the art can be used for communications between a client 210 and the SIP processing stack 206. The SIP processing stack 206 and client 210 may be separately running processes. It is also possible for one or more clients to run in a single process with each other or with the SIP stack 206 by using Light Weight Processes (LWP) or threads. A device 200 according to the present invention may use any combination of separate processes and/or threads of execution within processes. Communications between client processes and/or threads can be accomplished through Inter-Process Communications (IPC).

IPC mechanisms allow separately running processes to interact. Such interaction can be synchronous or asynchronous. Computer architectures offer various methods and mechanisms to facilitate IPC, such as network sockets, shared memory, signals, semaphores, pipes, messaging, etc. Various standard IPC protocols are known in the art, including Java RMI, CORBA, COM/DCOM, Remote Procedure Calls (RPC), etc. Various operating systems and development environments provide specific IPC features, such as IPC within the Symbian Operating System for mobile devices.

IPC protocols often allow programmers to transparently invoke methods on remote processes by making function calls. The processes can define Application Program Interface (API) methods usable by another IPC aware processes. These API methods can be used to initiate events, transfer data, process queries, etc. In reference to FIG. 2, the client 210 and SIP stack 206 can exchange SIP-related data using predefined API methods.

It is appreciated that the client 210 may contain its own network connections (not shown) in order to carry out data transfer used during communications. SIP is used along with other protocols, such as the Session Description Protocol (SDP), to provide session-oriented parameters such as data path definition, user capabilities, and allowable data types supported at both ends of a session. After SIP and SDP (or similar protocols) have established the session, it is up to the client 210 to perform the functions of transferring data and presenting data to users.

Although the client 210 may be configured to handle certain SIP functions, such as sending a REGISTER message to the network, the message can advantageously be communicated through the SIP stack 206. This frees the client 210 from having to deal with various timing and states needed to negotiate SIP exchanges.

The SIP stack 206 may be configured to handle outgoing messages for one or all of the clients 210, 212, 214, 216. The SIP stack 206 can also handle all incoming SIP messages destined for the clients 210, 212, 214, 216. Using the SIP stack 206 for receiving all incoming SIP messages offers numerous advantages over requiring each client handle its own SIP communications or signaling. For example, developers of client applications are freed from having to deal with including a full SIP stack with each client. Updates and fixes can be applied to the SIP stack 206 alone for the benefit of all client applications. Having a central processing point for SIP messages also reduces potential contention for network resources.

The SIP stack 206 keeps track of clients by associating each client to a unique network port. The concept of network ports is generally used in reference to TCP/IP and UDP/IP. As used herein, however, the concept of a port may refer to any unique identifier used to isolate incoming connections from the network. In the illustrated examples, the network ports used by the SIP stack are shown as TCP/UDP ports. TCP/UDP ports are 16-bit unsigned integers embedded in the protocol headers.

TCP and UDP ports may be well known or registered with the Internet Assigned Numbers Authority (IANA). Well-known ports (also referred to as system ports) range from 0 to 1023, and registered (or user) ports range from 1024 through 49151. Ports from 49152 through 65535 are private ports and can be dynamically allocated by any device for various uses. For example, well-known ports 80 and 23 are associated with HTTP and telnet, respectively. Port 5060 is a default, registered port for use with SIP, therefore by default SIP-enabled devices will attempt to connect on port 5060 unless another port has been pre-arranged between devices.

The SIP stack 206 is configured to associate a unique network port for each of the connected clients 210, 212, 214, 216. As seen in FIG. 2, the SIP stack 206 has a port "listener" 232, 234, 236, 238, 240 on five ports, 5060, 50060, 50061, 50062 and 50063, respectively. Each listener 232, 234, 236, 238, 240 is shown with its unique port appended to the IP address (in this example 10.0.0.5) of the communications device 200. The port listener may be implemented as a separate thread of execution that blocks waiting for an incoming connection on that port. Other ways of implementing a port listener are known in the art, include polling handles or file descriptors to detect an incoming connection.

The SIP stack 206 creates an association between four of the listeners 234, 236, 238, 240 with four clients, 210, 212, 214, and 216, respectively. By using this association, the SIP stack 206 can automatically forward SIP traffic to the associated client without having to examine the SIP message or make any other determinations of the correct destination.

The SIP stack 206 may have a predetermined static mapping of clients to ports, the clients may request certain ports, or the SIP stack 206 may dynamically allocate the ports on its own. The ports associated with the clients by the SIP stack 206 will typically user ports, i.e. those that are not well known or registered.

The fifth listener 232 shown in FIG. 2 uses the registered SIP port of 5060. The SIP stack 206 will typically reserve the registered SIP port 5060 for general use. The SIP stack 206 may also listen on port 5061, which is registered for SIP with Transport Layer Security (TLS). The SIP stack 206 may respond to a request on the registered ports in various ways. If the request is a query of client capabilities (such as contained in a SIP OPTIONS request), the SIP stack 206 may query the clients 210, 212, 214, 216 individually to determine a response. The SIP stack 206 may forward the query to one or more clients 210, 212, 214, 216 and allow the clients 210, 212, 214, 216 to respond in kind.

In general, to determine a destination client for messages received from a registered port (e.g. 5060), the SIP stack 206 can look at the contents of the message and compare the contents to client capabilities. Various portions of SIP messages (e.g. message start line, SIP headers, and message body) contain descriptions that can be used for determining the destination client (if any). To determine client capability, the SIP stack 206 may have some client capabilities registered in memory or in a persistent data storage 230. Alternatively, the SIP stack 206 could dynamically query clients in a manner similar to sending a SIP OPTIONS request.

In a SIP stack 206 configured to associate clients with user ports (i.e. not registered or well-known ports), the majority of incoming data will arrive on the user ports. Referring again to FIG. 2, an example connection 241 is formed by a connection request 242 arriving at the appropriate port listener 236 of the SIP stack 206. The connection 241 may be a TCP/IP socket, or may be the receipt of a UDP datagram. This connection 241 can be used to transfer any sort of data, although typically the SIP stack 206 expects the connection 241 to use the SIP protocol. The SIP stack 206 can immediately forward the data from the incoming request 242 to the client 212, because the SIP stack 206 has associated the 50061 user port of this listener 236 with the client 212.

Although the term "forward" as used above is often meant to construe the message is sent with little or no changes, as used herein the term "forward" is meant to indicate that substantive message data is communicated between clients and SIP stack 206. It is appreciated that when using an API, some parts of the data contained in a SIP message may be altered, added, or dropped to conform to the API. In general, the forwarding or communicating of SIP messages involves communicating that SIP message data required by the API or other IPC arrangement.

The SIP stack 206 will typically keep a mapping of client applications and associated ports for message processing. The association of ports with clients can occur at any time, although typically the clients are assigned ports by the SIP stack 206 when the clients are started. When a client 210 begins executing, it communicates with the SIP stack 206 to arrange an associated port.

The SIP stack 206 can be arranged to handle allocation of ports to all clients, therefore reducing the possibility of contention for client ports on the device 200. The SIP stack 206 can also communicate the assigned port to the client 210. The client 210 does not necessarily need to use this port number to carry on SIP communications with the SIP stack 206, although the port may be useful for troubleshooting or loopback testing.

Figure 3:
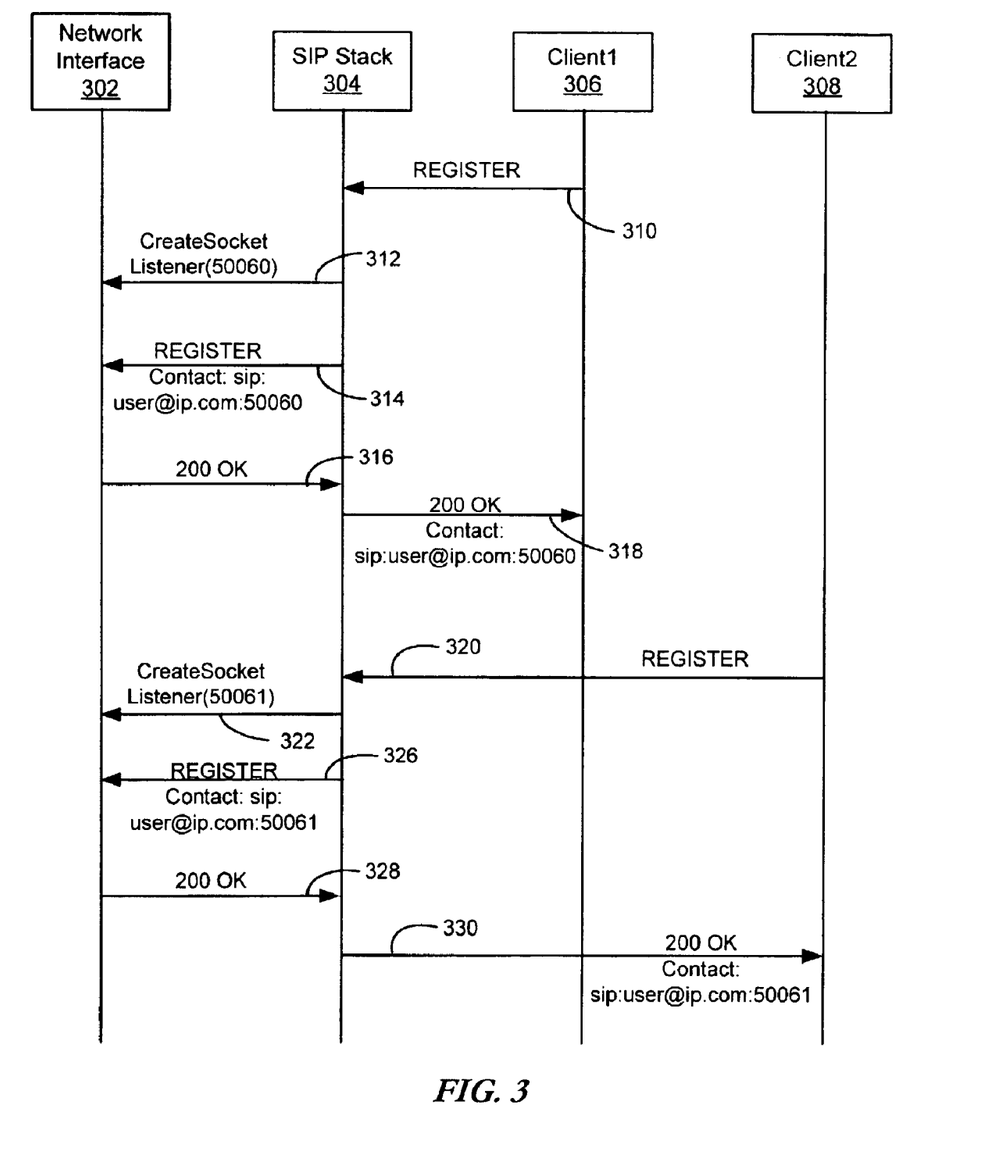
FIG. 3 is a message flow diagram showing sequences of initializing and using the SIP stack according to embodiments of the present invention.

Referring now to FIG. 3, an example is illustrated of interactions between a SIP stack 304 and clients 306, 308. A network interface 302 connects the SIP stack 304 and clients 306, 308 to a SIP network (not shown). The first client 306 sends a REGISTER request 310 to the SIP stack 304. This request 310 may occur as an actual SIP message sent to the SIP stack 304 by network transport, or it may be an API call utilizing IPC.

After receiving a request 310 from the client 306, the SIP stack 318 creates 316 a port listener using port 50060. The SIP stack 304 sends 314 a REGISTER message to a SIP registrar (not shown) through the network interface 302. Upon receiving 316 a "200 OK" response from the registrar, the SIP stack 304 informs 318 the client 306 by indicating that a port has been successfully associated with the client 306. In this example, the SIP stack responds 318 with a SIP "200 OK" message. The response message has a contact header entry indicating port 50060 has been associated with the client 306. Other ways of responding 318 to the client 306 may be implemented, such as including the assigned port number in a return value from an API call.

The process described above is repeated for the other client 308. As before, the client 308 sends 320 a REGISTER request to the SIP stack 304. In this case, the SIP stack 304 creates 322 a port listener with a new port (50061 for this client). Once the listener is created 322, the procedure continues as before by registering 326 with the network, receiving 328 a response, and responding 330 to the client.

In these examples, the SIP stack 304 can respond to errors resulting when attempting to create 322 the listener. If the SIP stack cannot create 322 the listener using the desired port (for example, the port is in use), the SIP stack can attempt to create 322 the listener using other ports. If a successful listener is eventually created 322, the remaining communications with the client 308 and SIP registrar can proceed normally. If there is a failure of the network interface (e.g. disconnection or bad configuration), the SIP stack 304 can send an error response to the client 308 so that the error can be communicated to the user.

The SIP stack 304 must also deal with errors negotiating with the network. If the SIP stack 304 receives an error from the registrar such as a "400 Bad Request" after a register request 314, 326, the SIP stack 304 must delete the socket listener and also inform the client of this error.

Figure 4:
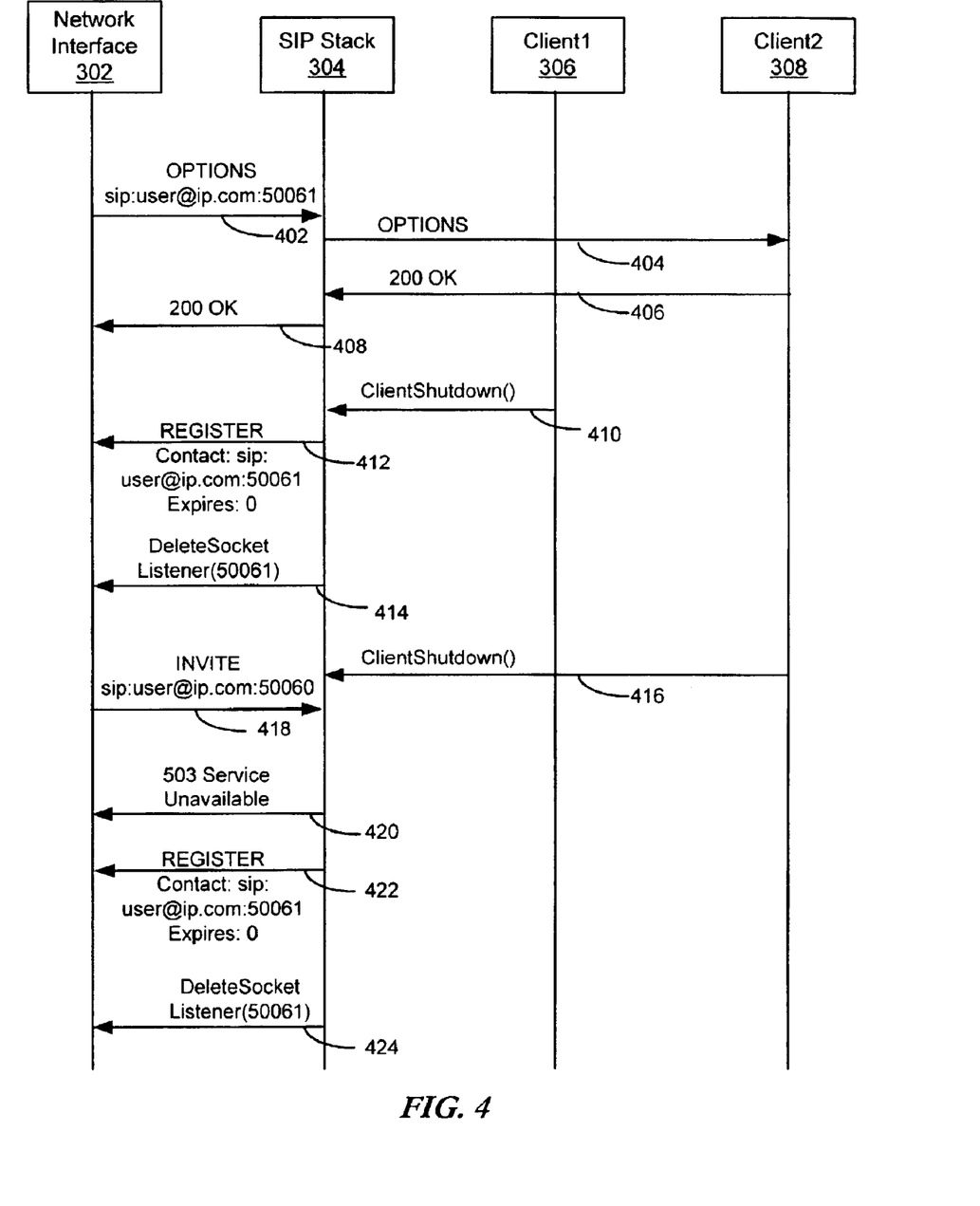
FIG. 4 is a message flow diagram showing sequences of communicating SIP messages and handling client shutdowns according to embodiments of the present invention.

When processing incoming connections, the SIP stack 304 maintains an internal state of port-to-client mappings. This internal state is used to direct incoming messages to the appropriate client. An example of directing incoming messages is shown in FIG. 4. In FIG. 4, the clients 306, 308 are assumed to be established as shown in FIG. 3, with client 306 associated with port 50060 and client 308 associated with port 50061.

An OPTIONS request message is received 318 from the network interface 302 at port 50061. The OPTIONS request is typically used to query a client to determine the client's capabilities. The SIP stack 304 forwards 404 the OPTIONS request to client 308 associated with this port. The client 308 responds 406 to the OPTIONS request with a "200 OK" message that lists the client's capabilities. The forward 404 and response 406 may be accomplished through SIP type communications between the SIP stack 304 and client 308, or may be invoked through an inter-process API. Once the SIP stack 304 receives the response from the client 308, the SIP stack 304 sends 408 the "200 OK" message to the network.

The SIP stack 304 may use alternate techniques to respond to the OPTIONS request. For example, instead of receiving 406 capabilities from the client 308, the capabilities can be read by the SIP stack 304 from a database or other persistent data storage. In this way, the SIP stack 304 can respond 408 to the network request without communicating with the client 308.

Although the client 308 may need to be aware of some aspects of SIP to receive and construct SIP messages, the SIP stack 304 can deal with various details (not shown) of SIP, such as ACKS, sequence numbers, and timeouts. This allows reducing the complexity of client 308, as only that SIP functionality of interest to the client 308 need be supported.

Also shown in FIG. 4 are examples of how the SIP stack 304 frees port listeners once a client 306 is no longer running. The client 306, upon being shutdown, communicates 410 a shutdown to the SIP stack 410. As shown here, this communication 410 is through an API call, ClientShutdown(). Other methods may be used to detect client shutdowns or crashing of applications. IPC mechanisms often have ways of determining when a communicating process has died, such as throwing exceptions in the code or sending signals or messages to the appropriate processes.

Once the SIP stack 304 has been informed 410 that the client 306 is shutting down, the SIP stack un-registers 412 this client. This is typically done by sending the SIP registrar a REGISTER message with the expiration value in the SIP header set to zero. The port listener corresponding to the client 306 is also deleted 414, thereby allowing the SIP stack 304 to recover this port for use by another client.

An alternate shutdown scenario is also shown in FIG. 4. Client 308 has signaled 416 a client shutdown. Before the SIP stack 304 can respond, and INVITE message is received 418 from the network. The SIP stack 304 is aware that client 308 is no longer active, and therefore responds 420 with a "503 Service Unavailable" message. The SIP stack 304 also un-registers 422 the client 308 and deletes 424 the port listener on the associated port.

It is appreciated that the example exchanges shown in FIGS. 3, 4 are shown for purposes of illustration, and not of limitation. Various changes may be made to the operations and sequences while still keeping within the spirit of the present invention. The SIP stack may be amenable to an object-oriented approach rather than the procedural approach illustrated. For example, each client and port listener could be abstracted to a client object of the SIP stack, and each client object can process the incoming and outgoing connections independently.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media such as resident memory devices, smart cards or other removable memory devices, or transmitting devices, thereby making a computer program product or article of manufacture according to the invention. As such, "computer readable mediums" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Communication mediums include, but are not limited to, communications via wireless/radio wave communication networks, the Internet, intranets, telephone/modem-based network communication, hard-wired/cabled communication network, satellite communication, and other stationary or mobile network systems/communication links.

From the description provided herein, those skilled in the art are readily able to combine software created as described with appropriate general purpose or special purpose computer hardware to create a data processing device and/or computer subcomponents embodying the invention, and to create a data processing device and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of processing a session establishment procedure for a plurality of applications of a data processing arrangement, comprising:
   associating a plurality of unique network ports of a network interface of the data processing arrangement with the plurality of applications so that each application is associated with a unique network port;
   employing a message processing stack to listen on the network interface at the plurality of unique network ports;
   receiving a message by the message processing stack at one of the unique network ports of the network interface; and
   communicating the message from the message processing stack to the application associated with the unique network port.

2. The method of claim 1, wherein the session establishment procedure comprises a session initiation protocol (SIP).

3. The method of claim 1, further comprising:
   employing the message processing stack to listen on a default SIP port of the network interface;
   receiving a message by the message processing stack at the default SIP port of the network interface; and
   communicating the message to a destination application of the plurality of applications based on the contents of the message.

4. The method of claim 1, further comprising deleting an association between the unique network port and the application when the application is no longer operative.

5. The method of claim 1, further comprising sending a response message from the destination application to the message processing stack and communicating the response message from the message processing stack to the network interface.

6. The method of claim 1, wherein communicating the message from the message processing stack to the application comprises using an inter-process communications between the message processing stack and the application.

7. The method of claim 1, wherein the plurality of unique network ports are allocated by the message processing stack.

8. A tangable computer-readable medium operable with a computing system capable of being coupled to a network interface for processing a session establishment procedure for a plurality of applications of the computing system, the computer-readable medium configured with instructions for causing the computing system to perform step comprising:
   associating a plurality of unique network ports of the network interface with the plurality of applications so that each application is associated with a unique network port;
   employing a message processing stack to listen on the network interface at the plurality of unique network ports;
   receiving a message by the message processing stack at one of the unique network ports of the network interface; and communicating the message from the message processing stack to the application associated with the unique network port.

9. The tangable computer-readable medium of claim 8, wherein the session establishment procedure comprises a session initiation protocol (SIP).

10. The tangable computer-readable medium of claim 8, wherein the computer-readable medium is further configured with instructions to perform steps comprising:
   employing the message processing stack to listen at a default network port of the network interface;
   receiving a message at the message processing stack from the default network port of the network interface; and
   communicating the message to a destination application of the plurality of applications based on the contents of the message.

11. The tangable computer-readable medium of claim 8, wherein the computer-readable medium is further configured with instructions to delete an association between the unique network port and the application when the application is no longer operative.

12. The tangable computer-readable medium of claim 8, wherein the computer-readable medium is further configured with instructions to perform steps comprising:
   sending a response message from the destination application to the message processing stack; and
   communicating the response message from the message processing stack to the network interface.

13. The tangable computer-readable medium of claim 8, wherein communicating the message from the message processing stack to the application comprises using an inter-process communications between the message processing stack and the application.

14. The tangable computer-readable medium of claim 8, wherein the plurality of unique network ports are allocated by the message processing stack.

15. The tangable computer-readable medium of claim 8, wherein the computing system comprises a mobile terminal.

16. A method of processing a session initiation protocol (SIP) message on a data processing device connected to a network interface, comprising:
   employing a SIP stack to listen at a plurality of ports of the network interface;
   receiving the SIP message at one of the plurality of ports;
   selecting a destination client application of the data processing device based on the port at which the message was received;
   communicating the SIP message from the SIP stack to the destination client application.

17. The method of claim 16, wherein one of the plurality of ports is a default SIP port, the method further comprising communicating the SIP message to a destination client application based on the contents of the message if the port at which the message was received is the default SIP port.

18. The method of claim 16, further comprising employing the SIP stack to allocate the plurality of ports.

19. The method of claim 16, wherein communicating the SIP message from the SIP stack to the destination client application comprises using an inter-process communications between the SIP stack and the destination client application.

20. The method of claim 16, further comprising sending a response message from the destination client application to the SIP stack and communicating the response message from the SIP stack to the network interface.

21. A system connectable to a network for processing a session initiation protocol (SIP) for one or more client applications, the system comprising:
   a network interface having a plurality of ports for receiving SIP messages from the network;
   a SIP processor for receiving SIP messages at the plurality of ports of the network interface;
   an inter-process communication means for facilitating communications between the SIP processor and the client applications; and
   wherein the SIP processor communicates SIP messages to the client applications using the inter-process communications means based on which port of the plurality of ports the SIP messages are received.

22. The system of claim 21, wherein one of the plurality of ports is a default SIP port, the SIP processor further arranged to communicate SIP messages to the client applications based on the contents of the message if the port at which the message was received is the default SIP port.

23. The system of claim 21, wherein the SIP processor is arranged to allocate the plurality of ports.

24. The system of claim 21, wherein the SIP processor is arranged to communicate SIP messages from the client applications to the network interface.

25. The system of claim 21, further comprising a server coupled to the network for communicating SIP messages.

26. The system of claim 21, wherein the network interface comprises a wireless network interface.

27. An apparatus for interfacing with a network, comprising:
   a network interface having a plurality of ports configured for receiving a session establishment message from the network;
   an inter-process communication means; and
   a processor arranged to:
      receive the session establishment message at one of the plurality of ports of the network interface;
      determine a destination client application selected from one or more client applications based on which port of the plurality of ports the session establishment message is received; and
      communicate the session establishment message to the destination application using the inter-process communication means.

28. The apparatus of claim 27, wherein the session establishment message is a session initiation protocol (SIP) message.

29. The apparatus of claim 27, wherein the processor is further arranged to allocate the plurality of ports of the network interface.

30. The apparatus of claim 27, wherein the processor is further arranged to communicate a response message from the destination client application to the network interface.

31. The apparatus of claim 27, wherein the apparatus comprises a mobile terminal.

32. The apparatus of claim 27, wherein the network interface comprises a wireless network interface.

* * * * *